(No Model.)

P. A. SPICER.
HAY TEDDER.

No. 345,932. Patented July 20, 1886.

Attest:
John Schuman

Inventor:
Pratt A. Spicer.
by his Att'y

UNITED STATES PATENT OFFICE.

PRATT A. SPICER, OF MARSHALL, MICHIGAN.

HAY-TEDDER.

SPECIFICATION forming part of Letters Patent No. 345,932, dated July 20, 1886.

Application filed July 23, 1885. Serial No. 172,401. (No model.)

*To all whom it may concern:*

Be it known that I, PRATT A. SPICER, of Marshall, in the county of Calhoun and State of Michigan, have invented new and useful Improvements in Hay-Tedders; and I do hereby declare that the following is a full, clear, and exact description thereof, reference being had to the accompanying drawings, which form a part of this specification.

This invention relates to certain new and novel improvements in hay-tedders; and the invention consists, first, in the construction and application of a check-spring to the forks; second, in the peculiar construction, arrangement, and combinations of the various parts, all as more fully hereinafter set forth.

Figure 1:
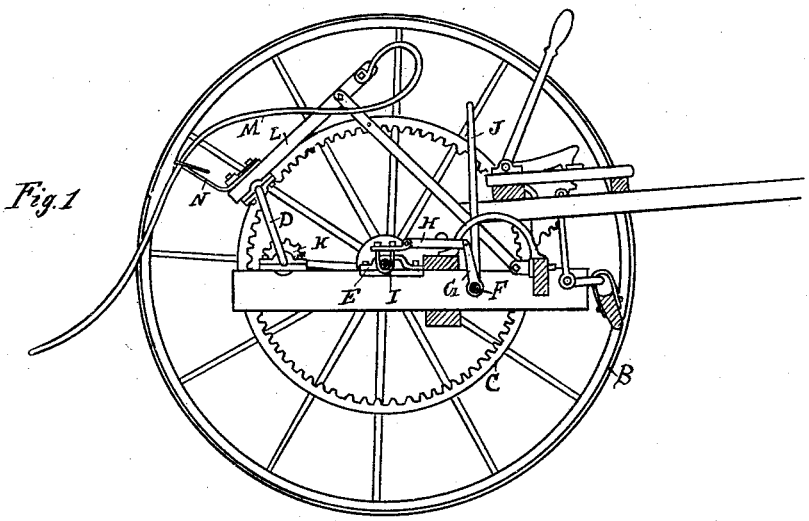
Figure 2:
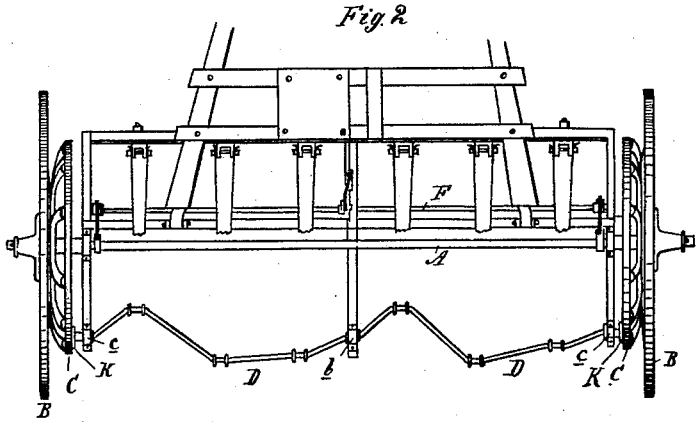
Figure 3:
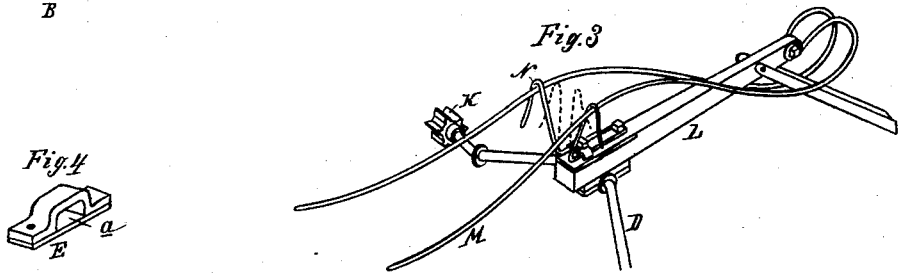
Figure 4:

Figure 1 is a vertical longitudinal section through my improved tedder, showing the operating parts out of gear. Fig. 2 is a plan view with the forks removed. Fig. 3 is an enlarged perspective of one of the forks and its check-spring. Fig. 4 is a detached perspective of one of the boxes in which the axle has a sliding movement.

In the accompanying drawings, which form a part of this specification, A represents the axle; B, the drive-wheels, each of which is provided with a gear, C, by means of which motion is imparted to the crank-shafts D, as in the usual manner. The wheels B rotate upon the axle, the latter being designed to be non-rotatable. Upon the side bars of the frame of the tedder are rigidly secured the boxes E, in each of which is formed an elongated opening, $a$, through which the ends of the axle project and find bearings.

F is a rock-shaft journaled in proper bearings in the frame, and to each end of this rock-shaft is secured a crank-arm, G, the free end of which is connected by means of a link, H, to a clip, I, which embraces the axle, as shown in Fig. 1. At a point convenient to the driver a lever, J, is secured to the rock-shaft, by means of which such rock-shaft is partially rotated, and suitable means (such as a toothed quadrant) should be arranged to hold the lever in its adjusted position. Upon referring to Fig. 1 it will be observed that the axle is at the rear end of the elongated opening in the box E, and that the gear of the drive-wheel is out of engagement with the pinion upon the end of the crank-shaft. If it is desired to impart motion to the crank-shaft, the driver pushes the lever forward, which partially rotates the rock-shaft, and by means of the connections herein described draws the frame backward until the engagement between the gear-wheels and pinion is made, and this movement is much more easily effected than in those constructions wherein the operating parts have to be raised and lowered.

The crank-shaft D is constructed in two parts, their inner ends being journaled in a box, $b$, common to both, secured to the central bar of the frame, while their outer ends pass through and find bearings in boxes $c$ upon the rear ends of the side bars of the frame. Upon the outwardly-projecting ends of the crank-shaft is secured a pinion, K, designed to be actuated by the drive-wheels, as hereinbefore described. Each section of the crank-shaft is bent zigzag, so as to form three or more wrists for actuating the fork-bars, and the intermediate portions of the crank-shaft form straight braces from one wrist to another and to the bearings of the shaft, no two of which are upon the same plane. By this construction one crank-wrist braces the other, thus making the three or more cranks formed from one bar much stiffer and stronger than in the ordinary constructions, wherein such bracing is not provided for.

L are the fork-bars, which are properly journaled upon the wrists of the crank-shafts, and are provided with the spring-forks M. To the lower end of the fork bar or stale L, I rigidly secure the check-spring N. This spring is preferably formed from one piece of spring-wire, and is bent into substantially the form shown, the hooked ends engaging with the tines of the fork, as shown. The tendency of this spring N is to assume the position shown in dotted lines, Fig. 3, but is kept in the position shown in full lines by the spring or spread of the fork-tines. The fork in gathering its load, but more particularly when coming in contact with an obstruction, is forced downward or toward the fork-bar, and this allows the arms of the check-spring to contract, at which time the tines of the fork will be between the hooked ends of the spring, but near the free ends thereof; but in discharging or "kicking" its load or in clearing an obstruction the fork springs suddenly back to its original position, and if allowed to strike with its full force into the "bite" of the check-spring one or the other would be liable to break from the sudden impact; but the check-spring, having contracted as the fork was depressed, brings the free ends of the check-spring directly in the line of retraction of the fork, and the tines of such fork slide up the outer arms of check-spring, overcoming its strength, and gradually assume their original and normal position.

What I claim as my invention is—

1. In a hay-tedder, a tedder-fork provided with a check-spring acting directly on the tines, substantially as described.

2. In a hay-tedder, the combination of the fork-bar L and fork M, arranged to be operated by a crank-shaft, D, with the check-spring N, substantially as and for the purposes described.

PRATT A. SPICER.

Witnesses:
GEO. S. WRIGHT,
N. J. FRINK.